May 18, 1965  A. J. COLAUTTI  3,184,209
HORIZONTAL DRIVE MEANS FOR POWERED SEAT ADJUSTERS
Filed July 10, 1963
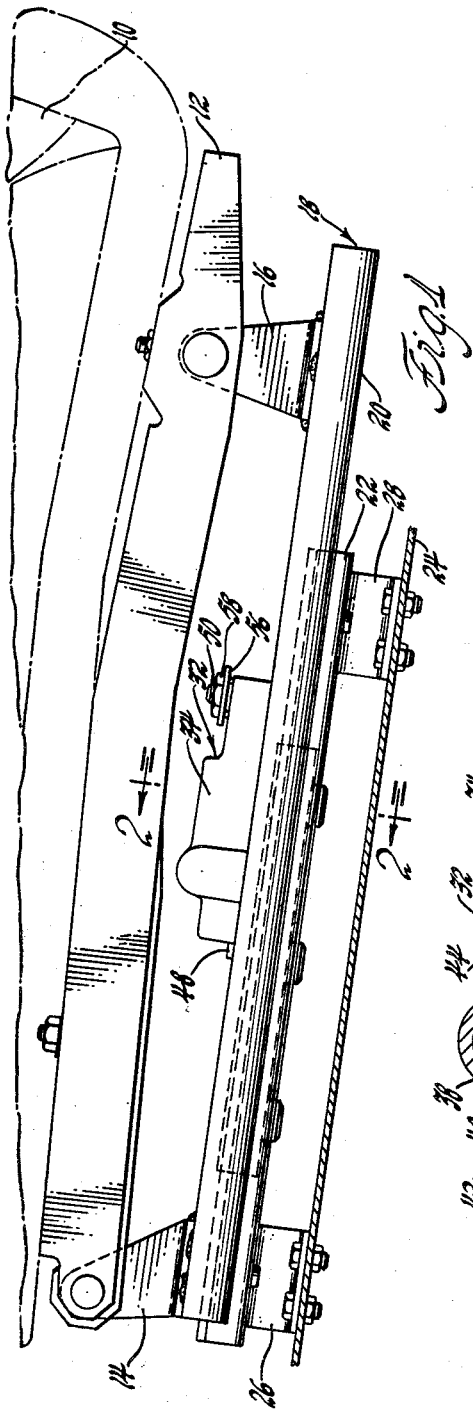
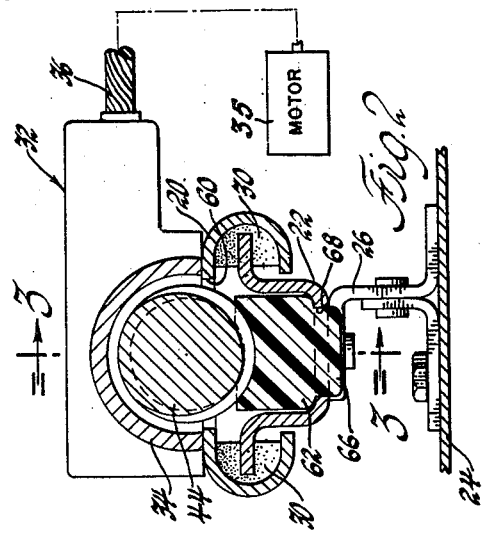
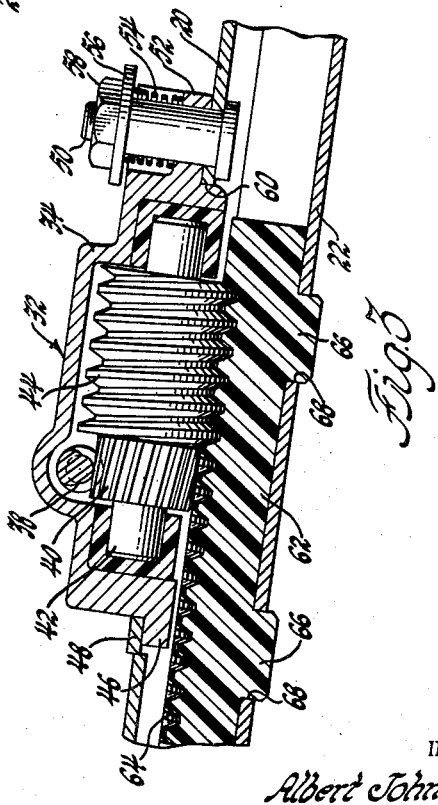
INVENTOR.
Albert John Colautti
BY
Robert L. Spencer
ATTORNEY United States Patent Office 3,184,209
Patented May 18, 1965

3,184,209
HORIZONTAL DRIVE MEANS FOR POWERED
SEAT ADJUSTERS
Albert J. Colautti, Windsor, Ontario, Canada, assignor to General Motors Corporation, Detroit, Mich., a corporation of Delaware
Filed July 10, 1963, Ser. No. 294,087
5 Claims. (Cl. 248—429)

This invention relates to powered seat adjusters and more particularly to a horizontal drive means for powered seat adjusters.

With the increased speed of the modern automobile, sudden deceleration and stops have become more commonplace. To protect the passengers and drivers of these automobiles, seat belts have been installed in vehicles to retain the passengers in their seats during such sudden stops. In some instances the seat belts have been attached to the vehicle floor but the newer tendency is to secure the seat belt to the vehicle seat so that during adjustment of the seat, the seat belt need not be adjusted. By attaching the seat belt to the seat the forces formerly absorbed by the vehicle floor must now be absorbed by the seat adjuster and its anchoring means to the floor. The common rack and pinion or power jack screw actuators used to move a vehicle seat adjuster horizontally are often too structurally weak to withstand loads imposed thereon by sudden stops of the vehicle when the seat belt is attached to the seat. It is an object of this invention to provide a horizontal drive means for a powered seat adjuster which has increased strength to resist impact loads imposed thereon by sudden stops of the vehicle.

Another objection to the commonly used horizontal actuating means is the excessive noise level of the mechanisms during operation, often caused by mismatched parts due to manufacturing tolerance build-up. A further object of this invention is to provide a horizontal drive mechanism for a powered seat adjuster which provides smooth operation and quiet actuation of the seat adjuster drive. Another object of this invention is to provide a compact horizontal drive mechanism for a powered seat adjuster which can automatically adjust for different manufacturing tolerances of the component structures.

As the drive means for horizontal actuation of the seat adjuster becomes more complicated and the space available between the seat and the vehicle floor becomes more limited due to the lowering of the overall vehicle height, the tendency is to build the horizontal driving means into the vehicle seat adjuster in such a way that the entire seat must be removed to adjust or repair the horizontal drive means. A further object of this invention is to provide a compact horizontal drive means for a powered seat adjuster which utilizes fewer parts and may be easily installed or removed from the seat adjuster for repair or adjustment.

These and other objects of the invention will become more apparent as reference is had to the specification and drawings wherein:

FIGURE 1 is a side view of a powered horizontal seat adjuster supporting a vehicle seat (shown in phantom) and incorporating the drive meanes of the present invention.

FIGURE 2 is a view taken substantially along the line 2—2 of FIGURE 1 showing a cross-sectional view of the upper and lower tracks with the nut segment mounted in the lower track and the upper track supporting the drive worm in meshing engagement with the helical threads of the nut segment.

FIGURE 3 is a view taken substantially along the line 3—3 of FIGURE 2 illustrating the manner in which the input worm is in meshing engagement with the worm gear for driving the drive worm in meshing engagement with the helical threaded nut segment secured in the lower track and also shows the manner in which the drive unit is mounted to the upper track for resiliently bearing against the nut segment.

Referring now to FIGURES 1–3, a vehicle seat 10 (shown in phantom lines) is secured to and supported by an upper support member 12 which in turn is supported by front arm 14 and a rear arm 16 secured to the horizontal seat adjuster mechanism indicated generally by the numeral 18. The horizontal adjuster mechanism 18 consists of an elongated upper track 20 which supports the seat 10 and is of generally C-shaped cross section and is positioned in mating engagement with an elongated generally U-shaped lower track 22 which is secured to the vehicle floor 24 by front and rear support legs 26, 28, respectively.

In order to mount the upper channel 20 on the lower channel 22 for slidable movement therealong, there are a plurality of bearing slugs 30 of anti-friction material, preferably nylon, fixedly mounted at spaced intervals on the lowered channel. The mating tracks and nylon slugs are of the type shown and explained in United States Patent 3,013,763 and well known in the art.

The horizontal drive means indicated generally by the numeral 32 is enclosed in a housing 34 resiliently secured to the upper track 20. Power is supplied to the horizontal drive means by a reversible electric motor 35 (see FIGURE 2) and is transmitted to the drive means by a flexible cable 36 which is operably connected to an input worm 38. The input worm 38 is in meshing engagement with the worm gear 40 secured on a shaft 42 which is journalled in the drive housing 34. Also secured on shaft 42 is a drive worm 44 which rotates as the shaft rotates. Thus, as power is transmitted from the electric motor to the flexible cable 36 to the input worm 38, the meshing engagement of input worm 38 with worm gear 40 drives shaft 42 in one direction or the other depending upon the direction of rotation of the electric motor 35.

One end of the housing 34 is secured to the upper track 20 by a foot extension 46 which hooks under a formed raised portion 48 of the upper track 20. The body of the housing 34 rests on the upper surface of the upper track 20. The other end of the housing is resiliently secured to the upper track by a stud bolt 50 anchored to the upper track 20 and extends through an opening in an extension 52 of the housing 34. A biasing coil spring 54 is positioned about the bolt 50 and bears against the extension 52. The spring 54 is compressed against the extension 52 by a washer 56 and nut 58 threaded to the bolt 50. The foot 46, extension 52 and spring 54 resiliently hold the housing 34 in a slot 60 formed in the upper track 20.

When the housing 34 is positioned on the upper track 20, the drive worm 44 extends below the surface of the upper track and is in meshing engagement with the threaded portion 64 of a nut segment 62 secured to the lower track 22. The nut segment 62 may be of Delrin or other suitable material or it may be formed as an integral part of the lower track, as by casting the lower track and nut segment of magnesium or aluminum material. The nut segment 62 has projections 66 extending from its lower side extending through slots 68 formed in the lower track 22 for holding the nut segment from longitudinal movement in the lower track and providing ease of installation by eliminating screws or bolts for holding the nut segment in place.

By using the coil spring 54 to resiliently hold the housing 34 in position, the manufacturing tolerances of the various parts are automatically compensated for and a uniform pressure is obtained between the drive worm and helical threads 64 of the nut segment 62, thus reducing wear and assuring a good contact therebetween. The spring 54 also provides a biasing force to hold the nut segment 62 in place on the lower track. The method of mounting the horizontal drive means on the upper track also permits easy removal of the drive means for repair or for aligning the mating parallel tracks generally used to support the vehicle seat.

In operation, as the electric motor drives the flexible cable 36 and the input worm 38 rotates the worm gear 40 and shaft 42, thus rotating drive worm 48 which moves longitudinally on the helical rack 64 of the nut segment 62 secured to the lower track 22, thus moving the upper track 20 relative to the lower track 22 and adjusting the seat in a fore and aft direction.

Since the increased use of seat belts in vehicles has resulted in the mounting of the seat belt to the seat frame rather than the vehicle floor, added stresses are often imposed on drive connections of the horizontal drive means. The multi-tooth contact of the drive worm 44 and gear segment 62 has greater strength than the common single tooth contact of a rack and pinion drive and is adequate to absorb shocks imposed thereon by seat belts in occurrences of panic stops.

While but one embodiment of the invention has been shown and described, it will be evident that numerous changes and modifications may be made therein. It is, therefore, to be understood that it is not intended to limit the invention to the embodiments shown but only by the scope of the claims which follow.

I claim:
1. In a vehicle body having a vehicle seat, a seat adjuster supporting said seat for fore and aft horizontal adjustment, a horizontal drive means for said seat adjuster having an upper track adapted to support said seat, a lower track secured to said vehicle body and engaging said upper track for supporting said seat and said upper track during generally horizontal fore and aft movement, a nut segment secured to said lower track, a drive worm rotatably and resiliently journalled in said upper track for movement therewith, spring means for biasing said drive worm into meshing engagement with said nut segment for longitudinal movement therealong during rotation of said drive worm whereby said upper track moves relative to said vehicle body thereby adjusting said seat fore and aft, and reversible power means operatively connected to said drive worm for selectively rotating said drive worm in opposite directions for driving said seat in fore and aft movement to selected adjustments.

2. In combination with a horizontal seat adjuster having an upper track interconnected with a lower track for slidably adjusting a vehicle seat generally fore and aft in a vehicle body, a drive means for said adjuster including a nut segment secured to said lower track, a housing resiliently connected to said upper track, a drive worm journalled in said housing for rotation therein, spring means for biasing said housing toward said upper track and said drive worm toward said nut segment, said drive worm being uniformly biased into meshing engagement with said nut segment by said spring means for good contact during movement therebetween when said drive worm is rotated, and reversible power means operably connected to said drive worm for selectively rotating said drive worm for adjusting said seat generally horizontal fore and aft in said vehicle body.

3. In combination with a horizontal seat adjuster having an upper track interconnected with a lower track for slidably adjusting a vehicle seat generally fore and aft in a vehicle body, a drive means for said seat adjuster including a nut segment secured to said lower track, said nut segment having downward extending projections, said lower track being formed with apertures for receiving said projections for holding said nut segment on said lower track, said drive means also including a housing secured to said upper track, a drive worm journalled in said housing for rotation therein, said drive worm in meshing engagement with said nut segment for relative movement therebetween when said drive worm is rotated, and reversible power means operably connected to said drive worm for selectively rotating said drive worm for adjusting said seat generally horizontal fore and aft in said vehicle body.

4. In combination with a horizontal seat adjuster having an upper track interconnected with a lower track for slidably adjusting a vehicle seat generally fore and aft in a vehicle body; said upper track having an aperture formed therein, a raised formed portion adjacent one end of said aperture, and a bolt secured to said upper track adjacent the other end of said aperture; a drive means for said seat adjuster including a nut segment secured to said lower track, a housing resiliently secured in said aperture of said upper track, said housing including a foot on one end for hooking under said formed portion of said upper track and an extension at the other end having an opening therein for positioning said extension about said bolt, a biasing spring positioned about said bolt and bearing against said extensiohn for biasing said housing against said upper track, a nut and washer on said bolt for holding staid biasing spring in biasing contact with said extension, a drive worm journalled in said housing for rotation therein, said drive worm in meshing engagement with said nut segment for relative movement therebetween when said drive worm is rotated, and reversible power means operably connected to said drive worm for selectively rotating said drive worm for adjusting said seat generally horizontal fore and aft in said vehicle body.

5. In combination with a horizontal seat adjuster having an upper track interconnected with a lower track for slidably adjusting a vehicle seat generally fore and aft in a vehicle body; said upper track having an elongated aperture formed therein, a raised formed portion adjacent one end of said aperture, and a bolt secured to said upper track adjacent the other end of said aperture; a drive means including a nut segment secured to said lower track, said nut segment having downward extending projections, said lower track being formed with apertures for receiving said projections for holding said nut segment on said lower track, a housing resiliently secured in said aperture of said upper track, said housing including a foot on one end for hooking under said formed portion of said upper track and an extension about said bolt, a biasing spring positioned about said bolt and bearing against said extension for biasing said housing against said upper track, a nut and a washer on said bolt for holding said biasing spring in biasing contact with said extension, a drive worm journalled in said housing for rotation therein, said drive worm in meshing engagement with said nut segment for relative movement therebetween when said drive worm is rotated, and reversible power means operably connected to said drive worm for selectively rotating said drive worm for adjusting said seat generally horizontal fore and aft in said vehicle body.

References Cited by the Examiner
UNITED STATES PATENTS

| | | | |
|---|---|---|---|
| 1,806,014 | 5/31 | Flintermann | 248—429 |
| 2,335,254 | 11/43 | Atwood et al. | 248—429 |
| 2,953,190 | 9/60 | Tanaka | 248—429 |
| 3,013,763 | 12/61 | Weberman | 248—429 |

CLAUDE A. LE ROY, *Primary Examiner.*